US010216606B1

(12) United States Patent
Magcale et al.

(10) Patent No.: US 10,216,606 B1
(45) Date of Patent: *Feb. 26, 2019

(54) DATA CENTER MANAGEMENT SYSTEMS AND METHODS FOR COMPUTE DENSITY EFFICIENCY MEASUREMENTS

(71) Applicant: Nautilus Data Technologies, Inc., Pleasanton, CA (US)

(72) Inventors: Arnold C. Magcale, San Ramon, CA (US); Daniel Kekai, San Ramon, CA (US)

(73) Assignee: Nautilus Data Technologies, Inc., Pleasanton, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/283,097

(22) Filed: Sep. 30, 2016

(51) Int. Cl.
 *G06F 1/32* (2006.01)
 *G06F 11/34* (2006.01)
 *G06F 1/26* (2006.01)
 *G06F 1/20* (2006.01)
 *G06F 11/30* (2006.01)

(52) U.S. Cl.
 CPC ............ *G06F 11/3442* (2013.01); *G06F 1/20* (2013.01); *G06F 1/26* (2013.01); *G06F 11/3006* (2013.01)

(58) Field of Classification Search
 CPC .............................. G06F 1/3206; G06F 9/5094
 See application file for complete search history.

(56) References Cited

U.S. PATENT DOCUMENTS

| 2013/0318022 | A1* | 11/2013 | Yadav | ...................... | G06N 5/02 706/46 |
| 2015/0120636 | A1* | 4/2015 | Gao | ..................... | G06F 11/3447 706/47 |
| 2016/0080482 | A1* | 3/2016 | Gilbert | ................ | H04L 41/5025 709/226 |

\* cited by examiner

*Primary Examiner* — Albert Wang
(74) *Attorney, Agent, or Firm* — Patent Ventures, LLC

(57) ABSTRACT

Embodiments disclosed include data center infrastructure management (DCIM) systems and methods configured to, collect data center compute systems, power systems, and facility systems data, trigger an action or actions based on a diagnosed or predicted condition according to the collected data, and thereby control via a compute, power, and facilities module, the compute systems, power systems and facility systems in the data center. According to an embodiment, the control via the compute, power, and facilities module comprises calibrating the compute, power, and facility systems based on an estimated compute requirement, and an associated power, cooling, and network data resource requirement. The estimated compute requirement comprises estimating compute density per real-time power wattage, and storage density per real-time power wattage.

10 Claims, 4 Drawing Sheets

DATA CENTER MANAGEMENT SYSTEMS AND METHODS FOR COMPUTE DENSITY EFFICIENCY MEASUREMENTS

CROSS REFERENCE TO RELATED APPLICATIONS

Dafa

BACKGROUND OF THE INVENTION

Field

The present invention relates to infrastructure management systems, especially with respect to data center facilities, but not restricted to the said data center facilities.

Related Art

A data center is a facility used to house computer systems and associated components. To serve this purpose, a data center is designed to maintain an ambient condition suitable for proper operation of the computer systems therein. Normally, in order to sustain the functioning of the system therein, a data center will consume more than twice the power that is needed due to the inefficiency of the cooling systems. Heat created by the system is disproportional to the resources it consumes for operation. Due to the unpredictability of the real-time computing power consumption, the heat generated by the system is hard to track too.

As data centers become increasingly complicated in structure and functions, their system's utilization of energy especially for cooling and operations have grown radically. As a result, increasing the energy-efficiency and reducing the resource consumption of the data centers becomes vital to long term sustenance of data center facilities.

Prior art systems and methods have attempted to develop multi-metric views that provide a broader understanding of data center cooling performance. These multi-metric views attempt to take into account aspects of performance by bringing together the Power Usage Effectives (PUE) ratio, IT Thermal Conformance and IT Thermal Resilience. However, there still remains a need for a more nuanced and multi-dimensional metric that address the most critical aspects of a data center's cooling performance. In order to establish a more complete view of facility cooling, the requirement to calculate cooling effectiveness and the data centre's future thermal state is also critical. There remains an additional need for a multi-dimensional metric that is easily scalable and that can accommodate additional new metrics in the future, as they are defined. Embodiments disclosed address precisely such a need.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a data center infrastructure management (DCIM) system configured to: over a network, collect data center compute systems, power systems, and facility systems data; based on the data collected, trigger an action according to a diagnosed or predicted condition of the compute systems, power systems and facility systems; control via a compute, power, and facilities module, the compute systems, power systems and facility systems in the data center; wherein the control via the compute, power, and facilities module includes calibrating the compute, power, and facility systems based on an estimated compute requirement, and an associated power, cooling, and network data resource requirement; and wherein the estimated compute requirement includes estimating compute density per real-time power wattage, and storage density per real-time power wattage. Other embodiments of this aspect include corresponding computer systems, apparatus, and computer programs recorded on one or more computer storage devices, each configured to perform the actions of the methods.

One general aspect includes in a data center infrastructure management (DCIM) system including a processing unit coupled to a memory element, and having instructions encoded thereon, a method including: over a network, collecting data center compute systems, power systems, and facility systems data; based on the collected data, triggering an action according to a diagnosed or predicted condition of the compute systems, power systems and facility systems; controlling via a compute, power, and facilities module, the compute systems, power systems and facility systems in the data center; wherein the controlling via the compute, power, and facilities module comprises calibrating the compute, power, and facility systems based on an estimated compute requirement, and an associated power, cooling, and network data resource requirement; and wherein the estimated compute requirement includes estimating compute density per real-time power wattage, and storage density per real-time power wattage. Other embodiments of this aspect include corresponding computer systems, apparatus, and computer programs recorded on one or more computer storage devices, each configured to perform the actions of the methods.

DETAILED DESCRIPTION

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

As stated above, the traditional way of monitoring data center infrastructure, collecting data from infrastructure systems, and managing the systems to allow maximizing the operational efficiency is now struggling to cope with new challenges brought by the growing complexity of data centers. Embodiments disclosed include systems and methods that address these challenges effectively and efficiently.

Embodiments disclosed include a Data Center Infrastructure Management (DCIM) system employed to continuously diagnose and predicted the condition of compute systems, power systems, and facility systems to enable automated estimation of compute requirement, and to optimize the operation of the data center system by using metrics which could allow the operator to further accommodate other considering Performance Indicators if needed.

Embodiments disclosed are different from, and superior to what currently exists. Embodiments disclosed included methods and systems for data center infrastructure management and data center operation. According to an embodiment, the Data Center Infrastructure Management System comprises estimation of the compute requirement of the data center described in this document, and metrics that can further accommodate other Performance Indicators, which are beyond the scope of existing systems.

Figure 1:
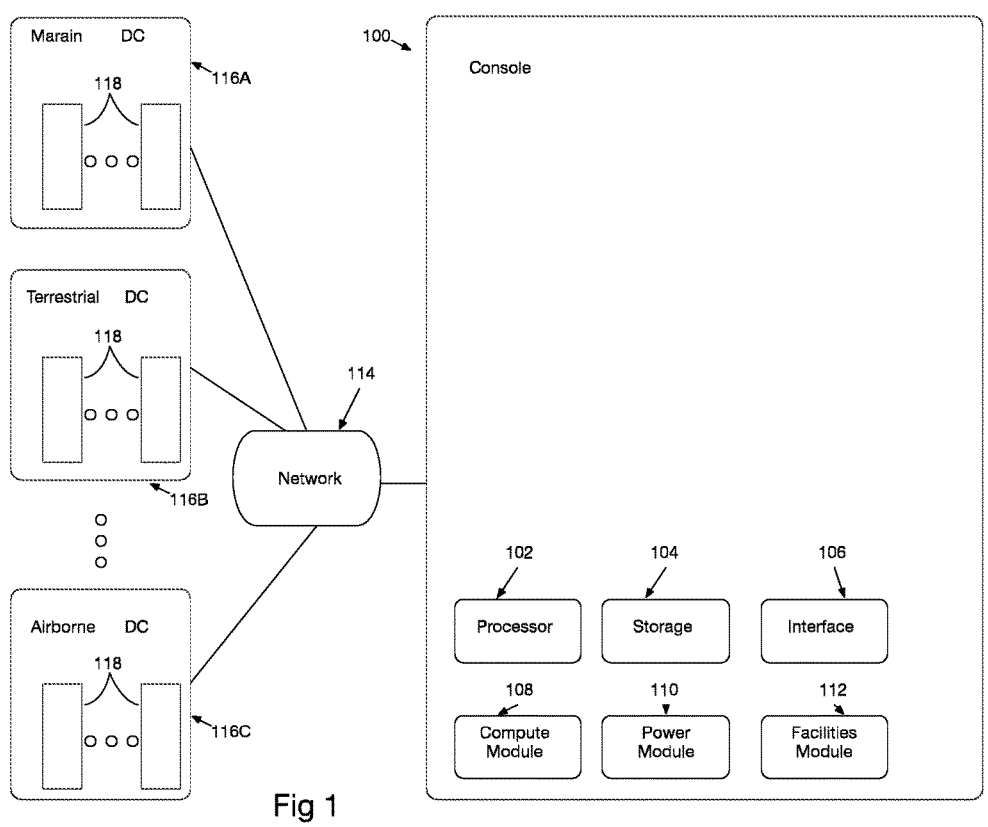
FIG. 1 illustrates an embodiment of the DCIM system.

FIG. 1 illustrates an embodiment of the Data Center Infrastructure Management (DCIM) System. The illustrated embodiment includes a processing unit 100 coupled to a memory element 104, and having instructions encoded thereon, configured to: over a network 114, collect compute systems data, power systems data, and facility systems data from data centers 116A, 116B, and 116C. The disclosed embodiment is configured to trigger an action based on a diagnosed or predicted condition of the collected compute systems, power systems and facility systems. According to an embodiment, the configuration enables control of the compute systems, power systems and facility systems in each of the illustrated data centers via a corresponding centralized compute module 108, power module 110, and facilities module 112. Preferably, the control via the compute, power, and facilities module comprises calibrating the compute, power, and facility systems based on an estimated compute requirement, and an associated power, cooling, and network data resource requirement. According to an embodiment, the estimated compute requirement comprises estimating compute density per real-time power wattage, and storage density per real-time power wattage.

Figure 2:
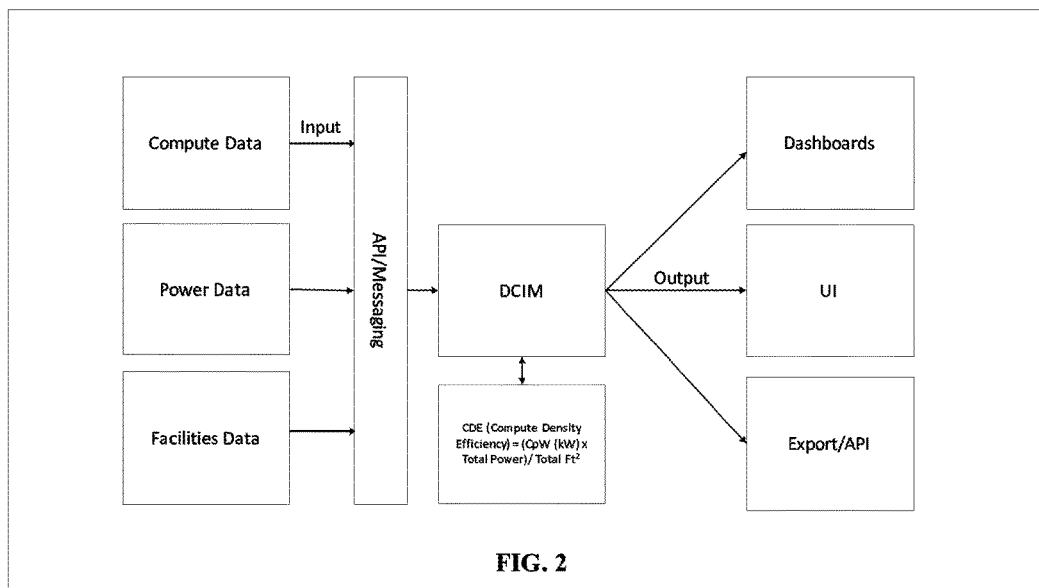
FIG. 2 illustrates a block diagram depicting data collection and compute density efficiency calculation in the DCIM system.

FIG. 2 illustrates a block diagram depicting data collection and compute density efficiency calculation in the DCIM system. With the compute data, power data and facilities data input into the DCIM system, the system estimates compute density per real-time power wattage, and storage density per real-time power wattage, and outputs the result to dashboards, networked User Interfaces and Export. According to an embodiment the Export could be presented in virtual reality and displayed on a smart phone, or other portable computing device.

According to an embodiment, the system is further configured to, based on the collected data center compute systems, power systems, and facility systems data, estimate a future compute systems condition, a future power systems condition, and a future facility systems condition as one type of Export showed in FIG. 2.

Figure 3:
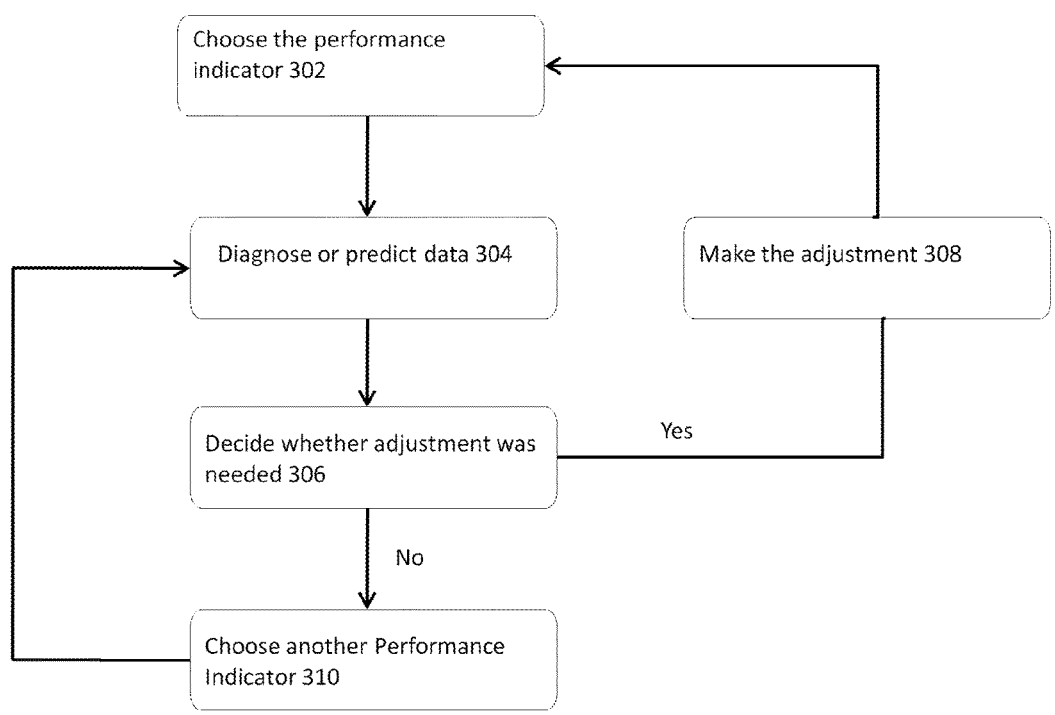
FIG. 3 depicts a logical view of the DCIM system according to an embodiment.

FIG. 3 illustrates via a flow diagram, the method of accommodating different metrics to adjust considering Performance Indicator to optimize the operation of the system. Step 302 includes choosing the considering Performance Indicator. In step 304, the related data is collected from the data center or predicted by the processor. In step 306, a decision is made based on the data aggregated in the memory from implemented machine learning to decide whether an adjustment or calibration is needed. Step 308 is implemented wherein an adjustment is made to the system. If the in the step 306 the metric is optimal, then the system proceeds to find or input manually another Performance Indicator and repeat the step 304 until the data center operation is optimized.

Figure 4:
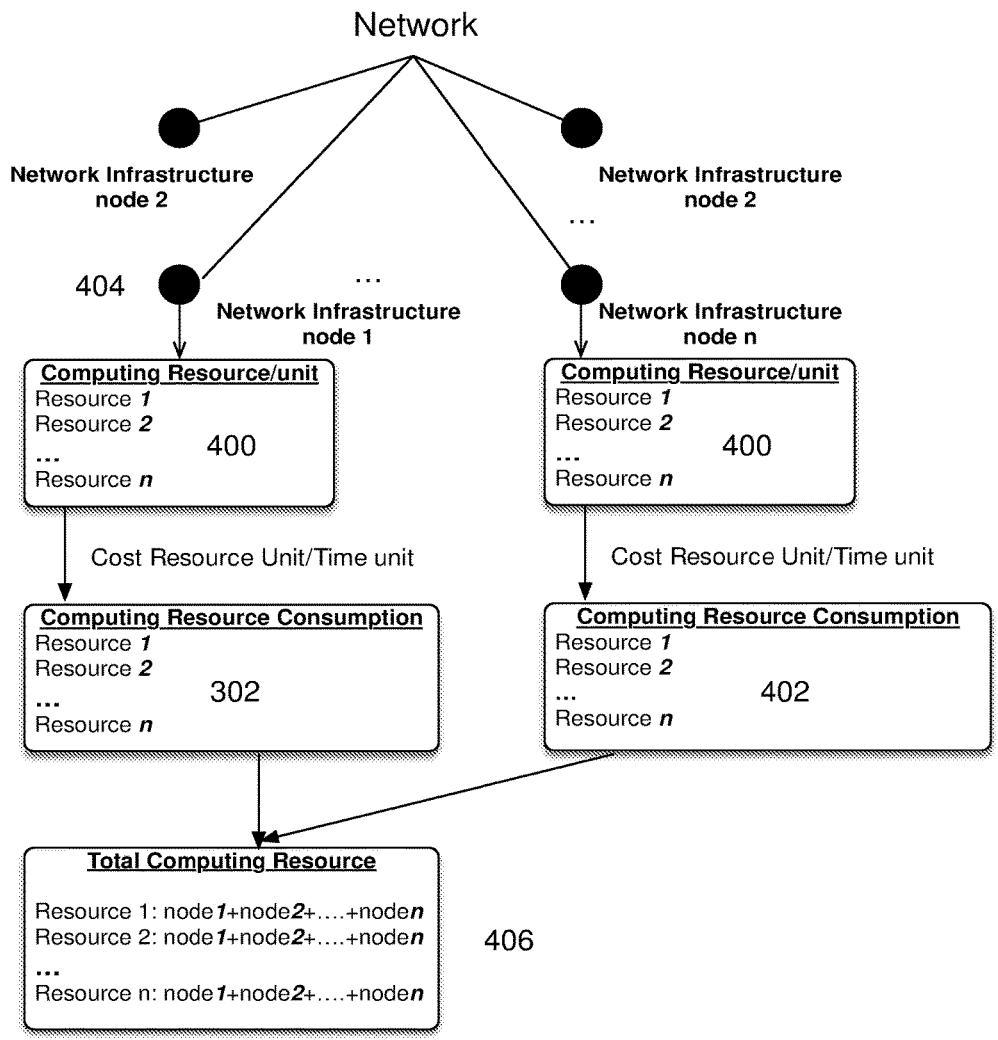
FIG. 4 depicts the system and method implementing complete computing resource consumption estimation over each node of a network of connected data centers.

FIG. 4 depicts the system and method implementing complete computing resource consumption estimation over each node of a network of connected data centers. Preferred embodiments implement Total Resource Utilization Efficiency (TRUE) optimizing not just compute resource consumption, but total efficiency of all components in a facility. According to the embodiment, the system is configured to: determine, for each compute system resource 400, a cost per predetermined time unit to deploy and operate the compute system resource, and to apply a cost conversion factor to each cost per predetermined time unit. Additionally, for each compute resource, the system generates an average number of resource units by averaging the number of resource units 402 over a plurality of network infrastructure nodes. And for an application executing on at least one of the network infrastructure nodes 404, the system generates a number of resource units used in a predetermined time period. Thus, the system can generate a total resource consumption 406 by adding the number of units consumed by the application in the predetermined time period for each compute resource.

Embodiments disclosed further enable system and methods that allow easy scalability and accommodation of additional new metrics in the future, as they are defined.

Embodiments enable increased productivity for data centers, as well as preventing the criteria from becoming out-dated for modern data center demands. Additionally, enable critical decision making based on a real-time assessment, rather than historic based guesswork.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art of infrastructure management, and more specifically automated infrastructure management especially pertaining to data centers, that although the preferred and alternate embodiments have been shown and described in accordance with the Patent Statutes, the invention is not limited thereto or thereby.

The figures illustrate the architecture, functionality, and operation of possible implementations of systems, methods and computer program products according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to automated power management and optimization in data centers, the system and process is highly reconfigurable, and may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A data center infrastructure management (DCIM) system configured to:
   over a network, collect data center compute systems, power systems, and facility systems data;
   trigger an action based on a diagnosed or predicted condition of the collected compute systems, power systems and facility systems;
   control via a compute, power, and facilities module, the compute systems, power systems and facility systems in the data center;
   wherein the control via the compute, power, and facilities module comprises calibrating the compute, power, and facility systems based on an estimated compute requirement, and an associated power, cooling, and network data resource requirement;
   and wherein the estimated compute requirement comprises estimating compute density per real-time power wattage, and storage density per real-time power wattage.

2. The data center infrastructure management (DCIM) system of claim 1, wherein the data center infrastructure management (DCIM) system is further configured to:
   determine, for each compute system resource, a cost per predetermined time unit to deploy and operate the compute system resource;
   apply a cost conversion factor to each cost per predetermined time unit;
   for each compute resource, generate an average number of resource units by averaging the number of resource units over a plurality of network infrastructure nodes;
   for an application executing on at least one of the network infrastructure nodes, generate a number of resource units used in a predetermined time period; and
   generate a total resource consumption by adding the number of units consumed by the application in the predetermined time period for each compute resource.

3. The data center infrastructure management (DCIM) system of claim 1, wherein the data center infrastructure management (DCIM) system is further configured to:
   via a predictive analytics engine configured to communicate over the network, analyze and store the collected operational data; and
   based on the collected and analyzed operational data, automatically make zero or more adjustments to the compute condition, and based on adjustments to the compute condition, to the power condition, and to the facility condition.

4. The data center infrastructure management (DCIM) system of claim 1, wherein the system is further configured to:
   based on the collected data center compute systems, power systems, and facility systems data estimate a future compute systems condition, a future power systems condition, and a future facility systems condition.

5. In a data center infrastructure management (DCIM) system comprising a processing unit coupled to a memory element, and having instructions encoded thereon, a method comprising:
   over a network, collecting data center compute systems, power systems, and facility systems data;
   triggering an action based on a diagnosed or predicted condition of the collected compute systems, power systems and facility systems;
   controlling via a compute, power, and facilities module, the compute systems, power systems and facility systems in the data center;
   wherein the controlling via the compute, power, and facilities module comprises calibrating the compute, power, and facility systems based on an estimated compute requirement, and an associated power, cooling, and network data resource requirement;
   and wherein the estimated compute requirement comprises estimating compute density per real-time power wattage, and storage density per real-time power wattage.

6. The method of claim 5, further comprising:
   determining, for each compute system resource, a cost per predetermined time unit to deploy and operate the compute system resource;
   applying a cost conversion factor to each cost per predetermined time unit;
   for each compute resource, generating an average number of resource units by averaging the number of resource units over a plurality of network infrastructure nodes;
   for an application executing on at least one of the network infrastructure nodes, generating a number of resource units used in a predetermined time period; and generating a total resource consumption by adding the number of units consumed by the application in the predetermined time period for each compute resource.

7. The method of claim 5, further comprising:
via a predictive analytics engine configured to communicate over the network, analyzing and storing the collected operational data; and
based on the collected and analyzed operational data, automatically making zero or more adjustments to the compute condition, and based on adjustments to the compute condition, to the power condition, and to the facility condition.

8. The method of claim 5, further comprising:
based on the collected data center compute systems, power systems, and facility systems data, estimating future compute systems condition, a future power systems condition, and a future facility systems condition.

9. A Data Center Infrastructure Management (DCIM) system configured to:

setup a metric reference point for the operation of a data center infrastructure;
collect data from a plurality of elements comprised in the data center infrastructure, over a network;
trigger a hardware processor to implement zero or more adjustments to the plurality of elements comprised in the data center infrastructure; and
maximize the performance of the data center infrastructure via the zero or more adjustments;
wherein the metric reference point comprises a plurality of Performance Indicators including compute density per real-time power wattage, and storage density per real-time power wattage; and
accommodate a user defined Performance Indicator.

10. The Data Center Infrastructure Management (DCIM) system of claim 9, wherein the Performance Indicator is defined by the hardware processor automatically, based on machine learning.

* * * * *